Patented Sept. 17, 1929

1,728,748

UNITED STATES PATENT OFFICE

JEAN D'ANS, OF BERLIN, GERMANY, ASSIGNOR TO DEUTSCHE GASGLÜHLICHT-AUER-GESELLSCHAFT M. B. H., OF BERLIN, GERMANY, A CORPORATION OF GERMANY

PROCESS FOR THE MANUFACTURE OF REFRACTORY SUBSTANCES

No Drawing. Application filed December 24, 1925, Serial No. 77,620, and in Germany December 24, 1924.

The manufacture of articles, slabs and other refractory substances of pure oxide of zirconium presents at present great difficulties. This is one of the reasons why this highly refractory material has not been introduced into the industries to a greater extent. The articles made of pure oxide of zirconium will too easily crack during burning and sintering, so that it was impossible to produce the necessary quantity of durable and useful articles.

It has now been found that these drawbacks can be avoided, if the pure oxide of zirconium, which is obtained for instance by strongly heating the basic sulphates of zirconium, is burned and sintered at temperatures exceeding 1800 degrees centigrade. It is possible then to work this sintered oxide of zirconium, according to well-known methods and without any particularly fine grinding, to refractory articles, but these must be burnt at temperatures of 2000 degrees centigrade and above.

If the articles made from oxide of zirconium are pressed in an exceedingly wet state, the temperature for burning may be chosen considerably lower down to about 1600° centigrade. It is not possible to state an exact temperature in this instance, since the reduction of temperatures of burning on the one hand depends on the pressure and on the other hand upon the grain and the origin of the material used. In order to obtain dense articles it is preferable to first burn these at about 1300 degrees centigrade and then finish them at temperatures of about 1800 degrees centigrade and more. Refractory articles produced after this method will resist temperatures considerably above 2000 degrees centigrade up to about 2600 degrees centigrade.

It has been further found, that to the pure oxide of zirconium, even if substances are to be used at temperatures far beyond 2000 degrees centigrade, certain admixtures may be made, which will facilitate the production of refractory masses from oxide of zirconium, but which will not reduce too much the fusing point of the masses of oxide of zirconium. It is desirable to choose these additions in such a way that the mass thus produced will obtain a sufficient mechanical solidity at a low temperature, and can then be finished in the oven at temperatures not too high.

It has also been found, that in substances of the kind referred to the presence of silica as well as other impurities of the natural ores of zirconium is noxious, since they will greatly prejudice the durability of the substances at high temperatures. However, excellent results are obtained, if small quantities of the oxides of alkaline earth metals and their equivalents, such as magnesium oxide, are added to pure oxide of zirconium, that is to say such oxides which possess a high fusing point and which can be reduced only with difficulty. As addition a quantity of less than five per cent is recommended. Very favorable results are obtained for instance, if 2 per cent of oxide of magnesium are added. The refractory mass must be pressed in a wet condition and burned at about 1300 degrees centigrade. These materials are then finished in the oven at higher temperatures. They will resist after this final burning temperatures exceeding 2000 degrees centigrade. More porous substances are obtained if the preliminary sintering is arrested at 1300 degrees centigrade and the pieces not pressed too hard are quickly heated after drying to temperatures from 1800 to 2000 degrees centigrade and beyond.

For producing highly refractory articles the substances referred to above must be strongly sintered in a preliminary step by burning them at a temperature of 1800 degrees centigrade and more. The substances thus sintered are then roughly comminuted and mixed in a wet state with about 5 per cent and more of the pulverulent fresh mixture of oxide of zirconium not burnt, then molded and finally burnt at temperatures exceeding 1800 degrees centigrade. If not too great quantities of non-sintered material are added, with the refractory bricks thus produced a fresh sintering will not take place at all. The quantity of the admixtures depends on the porosity desired with equal grain. The smaller the admixture the more porous are the articles after the burning process. The mechanical resistance caused by such porosity can be improved if burning is carried out at temperatures chosen correspondingly higher. The same result is obtained if the articles after mixing and molding are subjected to mechanical pressure. It has been found that for ordinary purposes an admixture of about 5 per cent and more up to about 25 per cent of fresh material may be used. It is possible of course to add to the sintered or used material of zirconium also comminuted material of highly burnt, sintered pure oxide of zirconium. The composition of the fresh mass need not wholly coincide with that of the used or sintered mass. Such materials are adapted for the production for instance of refractory bricks subjected to very high temperatures.

While in some of the appended claims I have referred to oxides of the alkaline earth metals, I desire it to be understood that this term is intended to cover equivalents, such as magnesium oxide.

I claim:

1. The process of making refractory articles, which consists in mixing pure zirconium oxide, with up to 5% of oxides of the alkaline earth metals, sintering the mixture and then forming refractory articles from the resulting sintered mixture.

2. The process of making refractory articles, which consists in mixing pure zirconium oxide, with up to 5% of oxides of the alkaline earth metals, sintering the mixture, forming articles from the resulting sintered mixture, and burning such articles.

3. The process of making refractory articles, which consists in mixing pure zirconium oxide, with up to 5% of oxides of the alkaline earth metals sintering the mixture, forming articles from the resulting sintered mixture, and burning such articles in two stages, first at a relatively low temperature, and then at a higher temperature.

4. The process of making refractory articles, which consists in mixing pure zirconium oxide, with up to 5% of oxides of the alkaline earth metals, sintering the mixture, subjecting the resulting sintered mixture to pressure in a wet condition, and burning the mixture thus treated.

5. The process of making refractory articles, which consists in mixing pure zirconium oxide, with up to 5% of oxides of the alkaline earth metals, sintering the mixture, subjecting the resulting sintered mixture to pressure in a wet condition, and burning the mixture thus treated, the burning being conducted in two stages, first at a relatively low temperature, and then at a higher temperature.

6. The process of making refractory articles, which consists in sintering pure zirconium oxide with an admixture of a small proportion of oxides of the alkaline earth metals, comminuting the sintered mass and mixing it with up to 5% of unsintered material of the same general character, molding the mixture, and burning the molded product.

In testimony whereof I affix my signature.

JEAN D'ANS.